United States Patent [19]
Steponaitis

[11] 3,836,925
[45] Sept. 17, 1974

[54] HOLDER FOR PROCESSED PHOTOGRAPHS

[76] Inventor: Vincas P. Steponaitis, 60 Ocean St., Dorchester, Mass. 02124

[22] Filed: June 23, 1972

[21] Appl. No.: 265,593

[52] U.S. Cl.................... 354/75, 354/344, 206/1 A
[51] Int. Cl. ............................................. G03d 3/00
[58] Field of Search............. 95/12, 13, 40, 98, 100; 206/1 A

[56] References Cited
UNITED STATES PATENTS
| | | | |
|---|---|---|---|
| 1,234,641 | 7/1917 | Dickson................................ | 95/98 |
| 3,087,400 | 4/1963 | Brandt................................... | 95/40 |
| 3,249,029 | 5/1966 | Wareham.............................. | 95/12 |

Primary Examiner—Samuel S. Matthews
Assistant Examiner—Alan Mathews

[57] ABSTRACT

Picture holders are disclosed for use in conjunction with cameras the film for which is self-processing with respect to each exposure. Each holder contains a compartment subdivided to provide a series of slots, one for each processed picture. Where the film to be used includes discardable materials, the holders have a second compartment to receive them. In one embodiment of the invention, the holders are attachable to the person. Where the cameras have a cover hingedly connected thereto, the holders are detachably secured within the opened covers.

2 Claims, 6 Drawing Figures

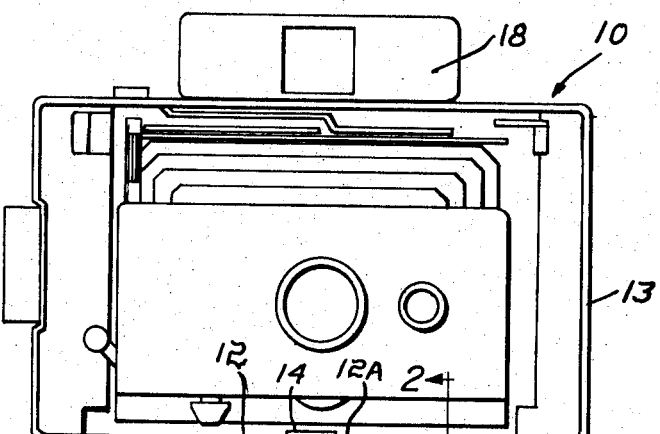
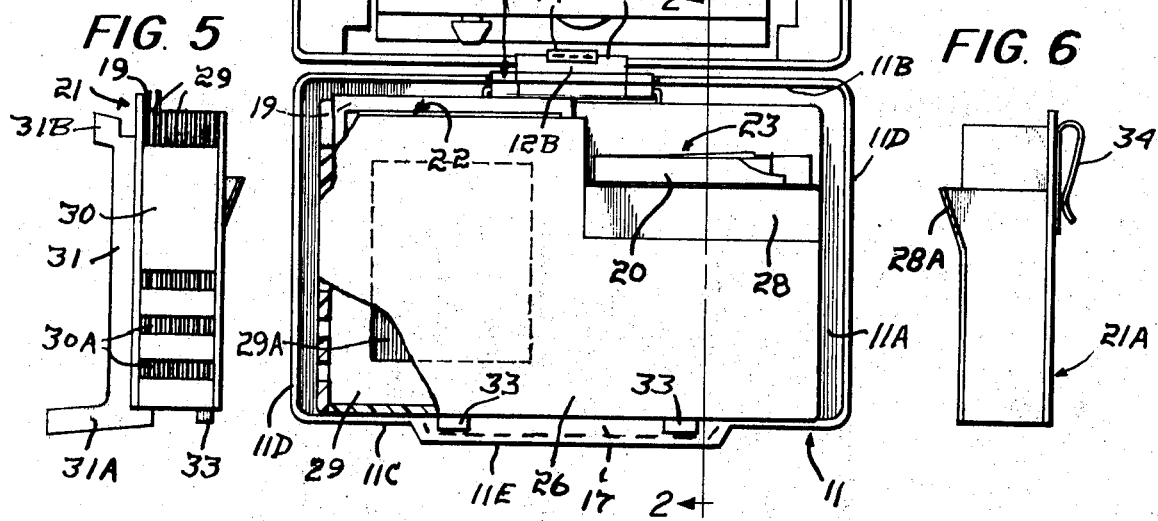
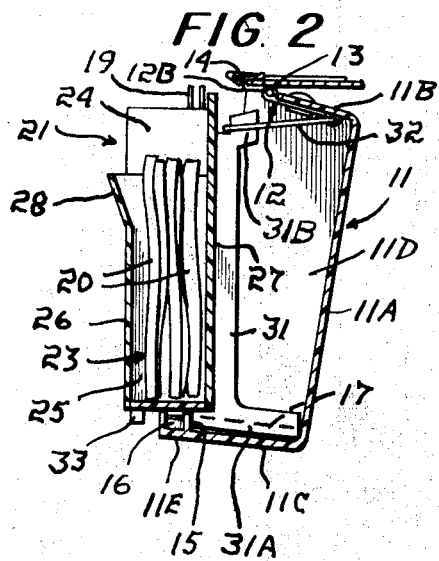
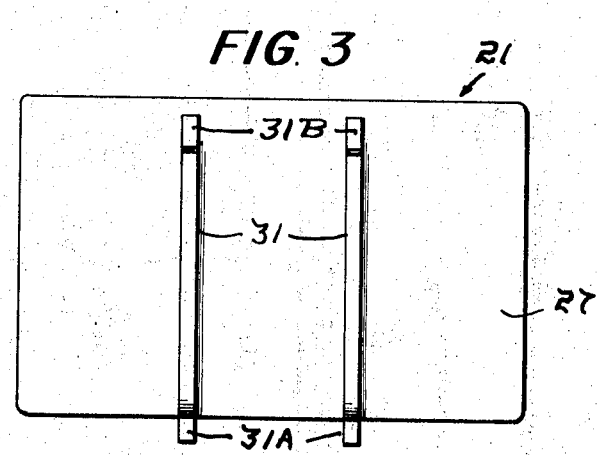
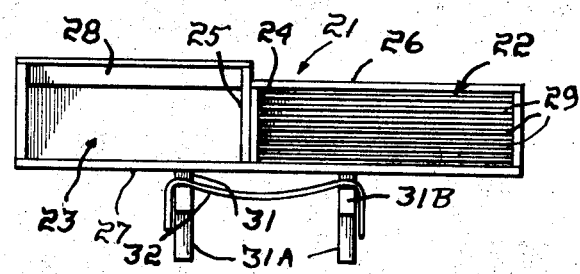

3,836,925

HOLDER FOR PROCESSED PHOTOGRAPHS

BACKGROUND OF THE INVENTION

It is, of course, widely recognized that Polaroid cameras and films have merited the wide acceptance they have received in enabling an exposure to be made and a self-processing unit then withdrawn from the camera from which, after a predetermined interval, a positive could be separated. Presently available black and white film requires, to prevent ultimate fading, a protective plastic coating and presently available color film must dry for a few minutes after it has been uncovered before it can be touched without being damaged.

While the cameras are easily operated and pictures of excellent quality are readily obtainable, there are the problems of disposing of the waste materials of each unit, holding the black and white pictures until their plastic coats have dried, and even with improved cameras and films eliminating the above problems, there is the problem of providing temporary storage for the pictures, particularly when taken from locations that are spaced apart by substantial distances as they often are outdoors or in a plant.

Reference is here made to U.S. Pat. Nos. 3,151,536 and 3,249,029.

THE PRESENT INVENTION

The principal objective of the present invention is to provide picture holders for use in conjunction with cameras the film for which is self-processing after being exposed.

This objective is attained by providing a holder with an open-mouthed compartment for processed pictures, and when the film includes discardable materials, a second compartment therefor. At least when the processed pictures are to be plastic coated, the picture-receiving compartment is subdivided to provide parallel slots, one for each picture. The holders are stable when positioned on a level surface.

When the holders are to be used with a camera having a cover hingedly connected thereto to depend therefrom when opened, they included first means dimensioned to fit within and be supported by the bottom part of the depending cover, and second means connectable to an anchor in the cover to cooperate with the first means in securing the holder to the cover with the mouths of the compartments exposed for the introduction of processed pictures and waste materials.

When the holders are to be used with a camera that does not have a hinged cover, they are generally similar except that they have means enabling them to be detachably attached to the person.

BRIEF DESCRIPTION OF THE DRAWINGS

In the accompanying drawings, preferred embodiments of the invention are shown of which FIG. 1 is a partly sectioned front view of a holder secured within the cover of a Polaroid camera;

FIG. 2 is a section taken approximately along the indicated line 2—2 of FIG. 1;

FIG. 3 is a rear view of the holder;

FIG. 4 is a top plan view thereof;

FIG. 5 is an end view of the holder; and

FIG. 6 is an end view of another holder in accordance with the invention.

THE PREFERRED EMBODIMENTS OF THE INVENTION

A conventional Polaroid camera, generally indicated at 10, includes a recessed cover 11 having a front wall 11A, side walls 11B and 11C interconnected by end walls 11D. The cover 11 is shaped and dimensioned to fit over the front portion of the camera 10 and its wall 11B has a hinge 12 provided with a pair of transversely spaced, U-shaped parts 12A fitting the central, bottom margin of the camera casing 13 to receive between them a spring latch 14 secured to said casing and engaging the hinge part 12B to detachably connect the cover 11 to the camera 10 with the hinge axis rearwardly of the front of the camera as will be apparent from FIG. 2. The cover wall 11C has a central projecting portion 11E having an internal channeled rib 15 extending lengthwise of its edge and holding a metal anchor 16 and, rearwardly thereof, a recess 17. The cover 11 may be swung upwardly into its closed position when the hinged viewer 18 is swung forwardly and downwardly from its operative position to enable its anchor 16 to engage with a magnet (not shown) by which the cover is yieldably held in its closed position with the recess 17 accommodating the portion of the viewer 18 that then protrudes slightly above the upper margin of the casing 13.

While the cover 11 may be detached when the camera is to be used in the home, for example, the cover wall 11B may be freed from the camera 10 and the camera used with the cover 11 depending therefrom, particularly when the user must walk a substantial distance from one picture-taking location to another.

The film used with such a camera is of the type that is self-processing after an exposure and is herein described as of the type in which, after each exposure, a film unit is withdrawn from the camera 10 and after a predetermined interval, a processed picture 19 is separated therefrom and the remainder 20 of the unit discarded as waste material which in the case of so-called "black and white" film, includes a caustic liquid so that care must be used in ensuring that it is not ingested by wildlife. Where such film is so-called "black and white", the processed pictures are usually given a plastic coat which, when dry, protects the picture against degradation.

While none of the features of the camera or the film are part of the present invention, they have been shown and described in order that the features of the generally indicated holder 21 of FIGS. 1 – 5 may be appreciated.

The holder 21 has first and second upwardly opening compartments generally indicated at 22 and 23, respectively, disposed side-by-side with their end walls 24 and 25 abutting and with common front and back walls 26 and 27, respectively. The mouths of both compartments are below the upper edge of the back wall 27 and the mouth of the compartment 23 is somewhat below that of the compartment 22 and is outwardly flared as at 28. The back wall 27 is dimensioned to enable the holder to fit within the cover 11.

The compartment 22 is for processed pictures 19 and it is subdivided by a series of partitions 29 interconnecting its end walls 24 and 30 and establish a series of upwardly opening slots, one for each processed picture 19. Desirably and as shown, the end wall 30 terminates slightly below the upper ends of the partition 29 and the end wall 24 to facilitate the entry of each picture into its slot. In addition it is preferred that the end wall 30 is provided with transverse slots 30A to facilitate the drying of the processed picture 19 temporarily stored in the compartment 22 and also that the partitions 29 have central apertures 29A.

The back wall 27 has two centrally located, spaced vertical ribs 31, each including a rearwardly disposed foot 31A that also extends part way under a compartment. The feet 31A are slightly inclined, downwardly and rearwardly, and are dimensioned to fit within the recess 17 of the cover wall 11C then support the holder 21 slightly forwardly inclined to position the mouth of the container outwardly of the cover wall 11B so that they are fully exposed. The upper ends of the ribs 31 terminate short of the upper edge of the back wall 27 and include an upwardly extending free end 31B inwardly offset to function as a hook.

The cover 11 shown in the drawings also includes a U-shaped spring clip 32 connected to the hinge 12 and biased against the cover wall 11A and for use in holding a cold clip (not shown) thereagainst, the cold clip being for use with color film in cold weather. Were it not for the clip 32, the cover of a camera or a case would have to be provided with an anchor for the holder 21, desirably of the same type since it is well adapted to be easily caught over the hooks 31B not only to hold the upper end of the holder in position but also to yieldably urge the feet 31A against the bottom of the recess 17 in the cover wall 11C. While the holder 21 is thus easily attached to the cover 11, it is held securely but may be easily detached therefrom by lifting the holder against the resistance of the spring clip 32 until the feet 31A will clear the rib 15. The holder 21 may then be pulled free from the clip 32.

As the angle of the feet 31A relative to the compartments would render the detached holder 21 unstable, it is provided with feet 33 spaced in front of the feet 31A to accommodate the rib 15 between them thus ensuring that the holder 21, when detached, will remain upright if placed on a level surface.

While, in the use of a camera such as the camera 10 in the home, the holder 21 might not be attached to its cover 11, its use in a convenient location affords the same advantages that are attendant its use when connected to the camera cover 11; namely, that the processed pictures 19 are temporarily protected in the compartment 22 while the waste film materials 20 may be folded and stored in the compartment 23 until they may be conveniently disposed of in a suitable manner.

With cameras using like film but not having hinged covers, holders such as the holder 21A shown in FIG. 6 may be used. The holder 21A is or may be identical to the holder 21 except that in place of the ribs 31 with their hooks and feet it is provided with means by which it may be secured to the person or his apparel, and such means may conveniently be a spring clip 34.

I claim:

1. In combination, a holder and a recessed cover for the front of a camera of the type utilizing film that is self-processing after exposure, said cover including a cover portion and end and side walls, one wall of said cover hingedly connected to said camera so that the cover may depend from the camera when the camera is to be used, a clip connected to said cover adjacent said wall and spring-biased to seat against the cover, the wall of the cover opposite said one wall having a shoulder adjacent its edge, said holder including at least one open-mouthed compartment, first means disposed and dimensioned to fit within said opposite wall between said shoulder and said cover portion, and second means adjacent the top of the holder disposed to be caught by said clip to maintain said holder seated against the second named cover wall rearwardly of said shoulder with the mouth of the holder exposed.

2. The combination of claim 1 in which the open mouthed compartment is for exposed pictures and the first means supports the holder in a forwardly inclined position and foot structure at the front of said holder rendering said holder stable when detached from the cover and positioned on a horizontal surface.

* * * * *